United States Patent
Masuda et al.

(10) Patent No.: US 9,091,195 B2
(45) Date of Patent: Jul. 28, 2015

(54) LAYERED COMPOSITE OXIDE, OXIDATION CATALYST, AND DIESEL PARTICULATE FILTER

(75) Inventors: Kohji Masuda, Tokyo (JP); Fumio Munakata, Kunitachi (JP)

(73) Assignee: Nissan Motor Co., Ltd., Yokohama (JP)

( * ) Notice: Subject to any disclaimer, the term of this patent is extended or adjusted under 35 U.S.C. 154(b) by 334 days.

(21) Appl. No.: 13/881,242

(22) PCT Filed: Oct. 3, 2011

(86) PCT No.: PCT/JP2011/072743
§ 371 (c)(1),
(2), (4) Date: Jun. 27, 2013

(87) PCT Pub. No.: WO2012/060174
PCT Pub. Date: May 10, 2012

(65) Prior Publication Data
US 2014/0147341 A1    May 29, 2014

(30) Foreign Application Priority Data

Nov. 4, 2010    (JP) .................................. 2010-247689

(51) Int. Cl.
*B01J 23/10*    (2006.01)
*B01J 23/34*    (2006.01)
(Continued)

(52) U.S. Cl.
CPC ............ *F01N 3/2803* (2013.01); *B01D 53/944* (2013.01); *B01J 23/007* (2013.01); *B01J 23/8892* (2013.01); *B01J 35/004* (2013.01); *B01J 37/0036* (2013.01); *B01J 37/04* (2013.01); *B01J 37/08* (2013.01); *C01G 45/1278* (2013.01); *C01G 49/0072* (2013.01); *C01G 51/60* (2013.01); *C01G 53/60* (2013.01);

*H01M 4/9025* (2013.01); *B01D 2255/204* (2013.01); *B01D 2255/2063* (2013.01); *B01D 2255/2073* (2013.01); *B01D 2255/20738* (2013.01); *B01D 2255/20761* (2013.01); *B01D 2255/402* (2013.01); *B01D 2255/65* (2013.01); *B01J 23/8946* (2013.01); *B01J 2523/00* (2013.01); *C01P 2002/34* (2013.01);
(Continued)

(58) Field of Classification Search
None
See application file for complete search history.

(56) References Cited

FOREIGN PATENT DOCUMENTS

JP    05-184929 A    7/1993
JP    07-136518 A    5/1995
(Continued)

OTHER PUBLICATIONS

G.Q. Yu et al. The Effect of Transition Element Doping on the Electronic and Magnetic Properties of Ma1.4Sr1.6Mn2O7. Solid State Communications 141. 2007, pp. 136-140. http://www.sciencedirect.com/science/article/pii/S0038109806009161.*

(Continued)

*Primary Examiner* — Walter D Griffin
*Assistant Examiner* — Jelitza Perez
(74) *Attorney, Agent, or Firm* — Global IP Counselors, LLP

(57) ABSTRACT

A layered composite oxide is provided which is excellent in oxygen ion conductivity and, is capable of effectively decreasing a PM oxidation temperature without using a noble metal such as platinum or the like. The layered composite oxide is used in an oxidation catalyst, DPF, a ternary catalyst, and a NOx purification catalyst. The layered composite oxide has a composition represented by the following formula (1), $La_{1.5}Sr_{1.5}Mn_{2-y}B_yO_7$ ... (1) (wherein B represents Cu and/or Fe, and y satisfies $0<y\leq0.2$).

9 Claims, 1 Drawing Sheet

(51) Int. Cl.

| | |
|---|---|
| *B01J 23/72* | (2006.01) |
| *F01N 3/28* | (2006.01) |
| *B01D 53/94* | (2006.01) |
| *B01J 23/00* | (2006.01) |
| *B01J 35/00* | (2006.01) |
| *B01J 37/04* | (2006.01) |
| *B01J 37/08* | (2006.01) |
| *C01G 45/12* | (2006.01) |
| *C01G 49/00* | (2006.01) |
| *C01G 51/00* | (2006.01) |
| *C01G 53/00* | (2006.01) |
| *H01M 4/90* | (2006.01) |
| *B01J 23/889* | (2006.01) |
| *B01J 37/00* | (2006.01) |
| *B01J 23/89* | (2006.01) |
| *F01N 3/035* | (2006.01) |

(52) U.S. Cl.
CPC ............ *C01P 2002/54* (2013.01); *F01N 3/035* (2013.01); *F01N 2510/065* (2013.01); *F01N 2510/0684* (2013.01); *Y02E 60/50* (2013.01); *Y02T 10/22* (2013.01)

(56) References Cited

FOREIGN PATENT DOCUMENTS

| | | |
|---|---|---|
| JP | 2010-030823 A | 2/2010 |
| JP | 2010-207754 A | 9/2010 |

OTHER PUBLICATIONS

Masaki Morita et al., "Sojo Perovskite-gata Fukugo Sankabutsu no Diesel Particulate Nensho Tokusei (2)", issued Mar. 16, 2011, p. 133, upper part, the Ceramc Society of Japan 2011 Nen Kai Koen Yokoshu.

* cited by examiner

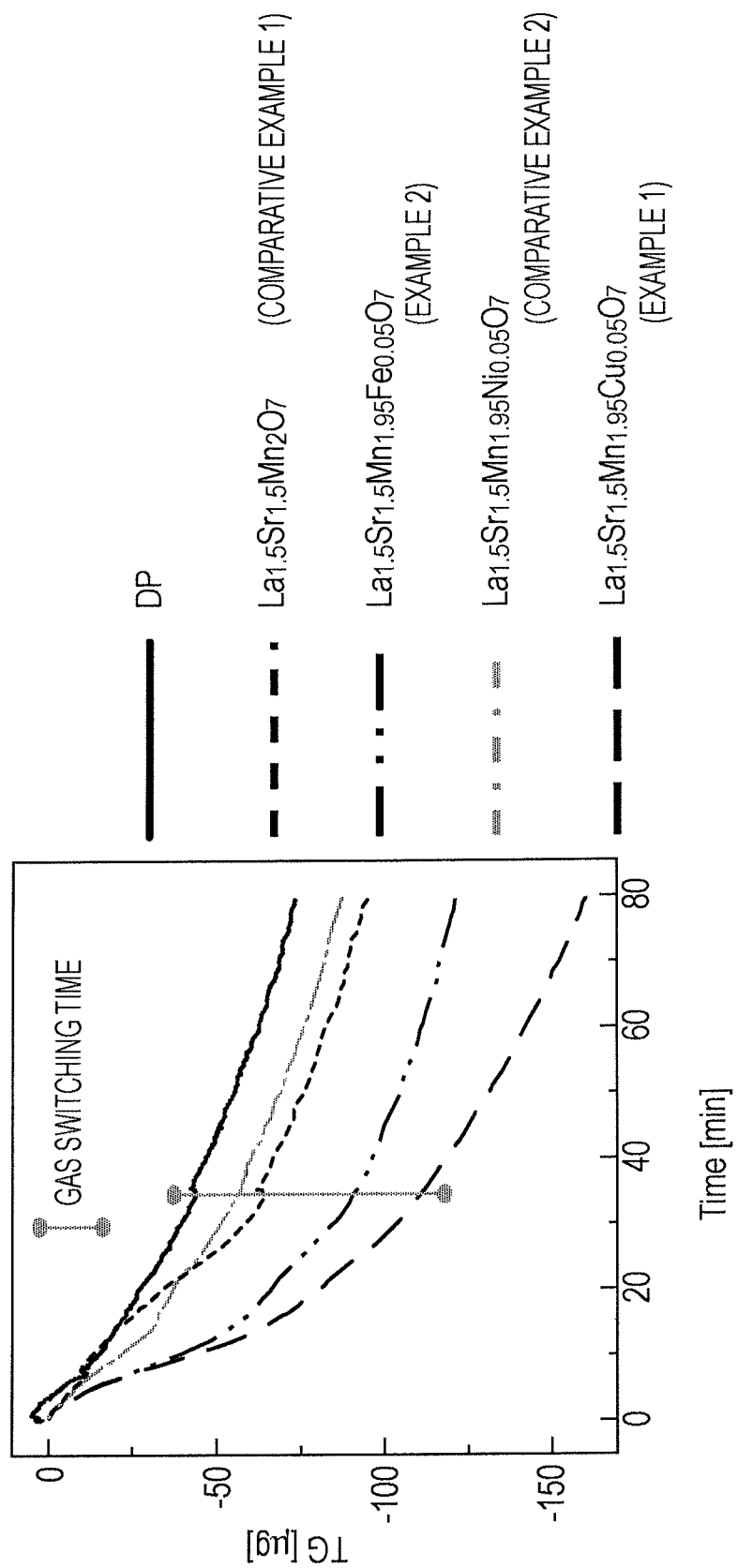

LAYERED COMPOSITE OXIDE, OXIDATION CATALYST, AND DIESEL PARTICULATE FILTER

CROSS-REFERENCE TO RELATED APPLICATIONS

This application is a U.S. National stage of International Application No. PCT/JP2011/072743, filed Oct. 3, 2011. This application claims priority to Japanese Patent Application No. 2010-247689, filed on Nov. 4, 2010. The entire disclosure of Japanese Patent Application No. 2010-247689 is hereby incorporated herein by reference.

BACKGROUND

1. Field of the Invention

The present invention relates to a novel layered composite oxide and, in further detail, relates to a layered composite oxide having a B-site controlled, layered perovskite-type structure and having excellent oxygen ion conductivity. The layered composite oxide of the present invention is advantageous for various catalysts and is particularly preferably used for a diesel particulate filter (DPF) configured to purify a particulate matter (PM).

2. Background Information

Materials having perovskite-type structures are represented by the general formula $ABO_3$ and ideally belong to the cubic system but frequently have distorted structures belonging to the tetragonal system, the orthorhombic system, the six-law system, and the like. The materials having such perovskite-type structures have attracted attention as electromagnetic materials and catalyst materials due to the distortion.

In recent years, attempts have been made to synthesize layered perovskite composite oxides exhibiting excellent characteristics by layering various materials having perovskite-type structures. For example, some of the materials attract attention as materials for carbon monoxide (CO) shift catalysts and electrolyte membranes of fuel cells (FC). Also, for exhaust gas purification catalysts, there are found reports on decomposition of nitrogen oxides (NOx), but high-temperature regions apart from a practical temperature region are still employed.

On the other hand, materials having a $LaGaO_3$-based perovskite-type structure represented by the general formula $ABO_3$ have been known as catalysts for PM purification in internal combustion engines, and it has been reported that PM oxidation temperatures of PM oxidation catalysts containing platinum supported on the materials are preferably 450° C. (refer to, for example, Japanese Unexamined Patent Application Publication No. 2006-341265).

SUMMARY

However, a satisfactory effect can be hardly yet achieved in the above-described various applications, and in particular, it is necessary to use a noble metal such as platinum or the like in PM oxidation catalysts, leaving a room for improvement.

The present invention has been achieved in consideration of the problem of related art, and an object of the present invention is to provide a layered composite oxide having excellent oxygen ion conductivity and, particularly, being capable of effectively decreasing a PM oxidation temperature without using a noble metal such as platinum or the like, and provided an oxidation catalyst, DPF, a ternary catalyst, and a NOx purification catalyst which use the layered composite oxide.

Solution to Problem

As a result of intensive research for achieving the above-described object, the inventors found that the object can be achieved by partially substituting elements at the B-site in Ruddlesden-Popper-type (general formula $A_3B_2O_7$) layered perovskite with another element, leading to the achievement of the present invention.

A layered composite oxide of the present invention has a composition represented by the following formula (1):

(in the formula, B represents Cu and/or Fe, and y satisfies $0<y\leq0.2$).

Also, an oxidation catalyst of the present invention contains the above-described layered composite oxide.

Further, a diesel particulate filter of the present invention is a diesel particular filter which purifies a particulate matter. The diesel particulate filter includes the above-described oxidation catalyst and an integral structure-type support coated with the oxidation catalyst.

Further, a ternary catalyst of the present invention contains the above-described layered composite oxide, and a nitrogen oxide purification catalyst of the present invention contains the above-described layered composite oxide.

According to the present invention, it is possible to provide a layered composite oxide having excellent oxygen ion conductivity and, particularly, being capable of effectively decreasing a PM oxidation temperature without using a noble metal such as platinum or the like by partially substituting B-site elements in predetermined layered perovskite by another element, and to provide an oxidation catalyst, DPF, a ternary catalyst, and a NOx purification catalyst which use the layered composite oxide.

BRIEF DESCRIPTION OF DRAWINGS

FIG. 1 is a graph showing analytical results of samples of examples.

DETAILED DESCRIPTION OF THE EMBODIMENTS

A layered composite oxide of the present invention is described below. As described above, a layered composite oxide of the present invention has a composition represented by the following formula (1):

(in the formula, B represents Cu and/or Fe, and y satisfies $0<y\leq0.2$).

Materials which can take a perovskite structure are generally metal oxides represented by the composition formula $ABO_3$. A stack of 3 or 4 layers of the perovskite structure serving as a basic skeleton is referred to as a "layered perovskite material". It is known that the layered perovskite material exhibits various physical properties by changing an A-site element present between layers or a B-site element present at the center of an oxygen octahedron.

The layered composite oxide of the present invention is generally represented by the composition formula $A_3B_2O_7$ and is produced by partially substituting elements at the B-site in a material referred to as "Ruddlesden-Popper-type layered perovskite" with at least one of copper (Cu) and iron (Fe). The substitution induces atomic valence control and electronic state control and accelerates introduction of oxygen vacancies. The oxygen vacancies improve the diffusion characteristic of oxygen in a crystal lattice and behave as oxygen adsorption points on a crystal surface.

In the layered composite oxide of the present invention, oxygen octahedrons present between layers are widely distributed in a crystal lattice, and the electron density of oxygen can be widely shared, thereby improving oxygen ion conductivity. Therefore, the layered composite oxide of the present invention has excellent oxidation characteristics and typically is capable of decreasing a PM oxidation temperature and improving an oxidation rate.

In the formula (1), Cu and/or Fe can be applied as B, but cobalt (Co), chromium (Cr), nickel (Ni), and zinc (Zn) can also be used. In addition, Mn can be substituted with a transition metal element having substantially the same ion radius as Mn, such as iron (Fe), cobalt (Co), nickel (Ni), and the like.

However, in the present invention, a substitution element is preferably Cu from the viewpoint of excellent oxidation characteristics of the resultant layered composite oxide. Since Cu is bivalent while Mn is trivalent, Cu substitution accelerates introduction of oxygen vacancies due to valency control, thereby improving the oxygen diffusion characteristic in a crystal lattice of the layered composite oxide and facilitating the formation of oxygen adsorption points (oxygen vacancies) on a crystal surface.

In the formula (1), y satisfies $0 < y \leq 0.2$, but y exceeding 0.2 is undesirable because a Mn—O—Mn network may be broken due to a difference between ion radii ($Cu^{2+}$: r of 0.073 nm, $Mn^{3+}$: r of 0.0065 nm).

The above-described layered composite oxide of the present invention is excellent in oxygen ion conductivity and is thus excellent in oxidation characteristics, particularly PM oxidation characteristics, and can be used as various materials and catalysts requiring such a function. Specifically, the layered composite oxide of the present invention can be used as a PM oxidation catalyst due to the excellent PM oxidation characteristics, a ternary catalyst due to excellent oxidation characteristics of hydrocarbons (HC) and carbon monoxide (CO), a NOx decomposition catalyst due to NOx reduction characteristics, and a fuel cell electrode catalyst and a photocatalyst due to excellent oxygen ion conductivity.

Next, a method for producing the layered composite oxide of the present invention is described. The layered composite oxide of the present invention can be generally prepared by a solid-phase method. Specifically, the layered composite oxide can be prepared by determining a desired composition according to the formula (1), weighing lanthanum oxide ($La_2O_3$), strontium carbonate ($SrCO_3$), manganese oxide ($Mn_2O_3$), and copper oxide (CuO) to satisfy the desired composition, mixing these materials, calcining the mixture at about 1200° C. for about 24 hours, again mixing the mixture, and then firing the mixture at 1450° C. for 24 hours.

Next, an oxidation catalyst of the present invention is described. The oxidation catalyst of the present invention contains the layered composite oxide of the present invention described above and exhibits excellent oxidation characteristics. Specifically, the oxidation characteristics of PM such as smoke and soot are excellent, and PM can be purified by oxidation at a typical temperature of 270° C. or more without using a noble metal such as Pt or the like.

The oxidation catalyst of the present invention contains the layered composite oxide as an essential component but can further contain various components other than this. Examples of the other components which can be contained include alumina capable of improving a specific surface, refractory inorganic base materials such as ceria ($CeO_2$) and zirconia ($ZrO_2$), and porous materials having uniform pores, such as zeolite and the like. Also, platinum (Pt), palladium (Pd), rhodium (Rh), other noble metals can be contained.

When the oxidation catalyst of the present invention is applied to an internal combustion engine, the oxidation catalyst of the present invention is preferably used by coating an integral structure-type support, such as a honeycomb-like monolith support, with the oxidation catalyst. Examples of the monolith support include ceramic supports such as cordierite, silicon carbide (SiC), and the like, and metallic supports such as stainless steel and the like, but any one of these supports can be preferably used.

Next, a diesel particulate filter (DPF) of the present invention is described. The DPF includes the oxidation catalyst of the present invention and an integral structure-type support coated with the oxidation catalyst.

The oxidation catalyst is as described above. In addition, the above-described honeycomb-like monolith support can be used as the integral structure-type support, but in particular, a honeycomb support having a shape in which ends of a plurality of cells are alternately closed on one of the sides to form a checkered pattern by cell open ends and cell closed ends in an end surface, i.e., a checkered honeycomb support, can be preferably used.

Next, a ternary catalyst and a nitrogen oxide (NOx) decomposition catalyst of the present invention are described. Both the catalysts contain the layered composited oxide of the present invention described above as an essential component. The catalysts can further contain various components other than the layered composite oxide. Like in the above-described oxidation catalyst, examples of the other components which can be contained include alumina capable of improving a specific surface, refractory inorganic base materials such as ceria ($CeO_2$) and zirconia ($ZrO_2$), and porous materials having uniform pores, such as zeolite and the like. Also, platinum (Pt), palladium (Pd), rhodium (Rh), other noble metals can be contained. Further, an integral structure-type support such as a honeycomb-like monolith support or the like can also be used.

EXAMPLES

The present invention is described in further detail below with reference to examples and comparative examples, but the present invention is not limited to these examples.

Example 1

According to the well-ground composition $La_{1.5}Sr_{1.5}Mn_{1.95}Cu_{0.05}O_7$, lanthanum oxide ($La_2O_3$), strontium carbonate ($SrCO_3$), manganese oxide ($Mn_2O_3$), and copper oxide (CuO) were weighed out and mixed using an agate mortar. Next, the resultant mixture was calcined at 1200° C. for 24 hours, and the resultant sample was again further mixed, and fired at 1450° C. for 20 hours to produce a fired product. The resultant fired product was ground to produce a layered composite oxide of this example.

Example 2

According to the well-ground composition $La_{1.5}Sr_{1.5}Mn_{1.95}Fe_{0.05}O_7$, lanthanum oxide ($La_2O_3$), strontium carbonate ($SrCO_3$), manganese oxide ($Mn_2O_3$), and Fe oxide ($Fe_2O_3$) were weighed out and mixed using an agate mortar. Next, the resultant mixture was calcined at 1200° C.

for 24 hours, and the resultant sample was again further mixed, and fired at 1450° C. for 20 hours to produce a fired product. The resultant fired product was ground to produce a layered composite oxide of this example.

Example 3

According to the well-ground composition $La_{1.5}Sr_{1.5}Mn_{1.9}Fe_{0.1}O_7$, lanthanum oxide ($La_2O_3$), strontium carbonate ($SrCO_3$), manganese oxide ($Mn_2O_3$), and Fe oxide ($Fe_2O_3$) were weighed out and mixed using an agate mortar. Next, the resultant mixture was calcined at 1200° C. for 24 hours, and the resultant sample was again further mixed, and fired at 1450° C. for 40 hours to produce a fired product. The resultant fired product was ground to produce a layered composite oxide of this example.

Example 4

According to the well-ground composition $La_{1.5}Sr_{1.5}Mn_{1.8}Fe_{0.2}O_7$, lanthanum oxide ($La_2O_3$), strontium carbonate ($SrCO_3$), manganese oxide ($Mn_2O_3$), and Fe oxide ($Fe_2O_3$) were weighed out and mixed using an agate mortar. Next, the resultant mixture was calcined at 1200° C. for 24 hours, and the resultant sample was again further mixed, and fired at 1450° C. for 40 hours to produce a fired product. The resultant fired product was ground to produce a layered composite oxide of this example.

Comparative Example 1

According to the well-ground composition $La_{1.5}Sr_{1.5}Mn_2O_7$, lanthanum oxide ($La_2O_3$), strontium carbonate ($SrCO_3$), and manganese oxide ($Mn_2O_3$) were weighed out and mixed using an agate mortar. Next, the resultant mixture was calcined at 900° C. for 24 hours, and the resultant sample was again further mixed, and fired at 1050° C. for 24 hours to produce a fired product. The resultant fired product was ground to produce a layered composite oxide of this example.

Comparative Example 2

According to the well-ground composition $La_{1.5}Sr_{1.5}Mn_{1.95}Ni_{0.05}O_7$, lanthanum oxide ($La_2O_3$), strontium carbonate ($SrCO_3$), manganese oxide ($Mn_2O_3$), and nickel oxide (NiO) were weighed out and mixed using an agate mortar. Next, the resultant mixture was calcined at 1200° C. for 24 hours, and the resultant sample was again further mixed, and fired at 1450° C. for 20 hours to produce a fired product. The resultant fired product was ground to produce a layered composite oxide of this example.

Performance Evaluation

The layered composite oxide produced as described above in each of the examples and PM collected from an automobile engine were weighed out at a ratio of 1/1 by mass and physically mixed using a mortar to prepare a sample of each of the examples. A mixed gas containing 10 vol % of oxygen gas ($O_2$) and the balance amount of nitrogen gas ($N_2$) or argon gas (Ar) was introduced into the sample of each of the examples, followed by TG-DTA (thermogravimetric-differential thermal analysis). According to a temperature schedule, the temperature was increased to 270° C. at 10° C./min under flowing of the Ar gas at 100 cc/min and kept as it was for 10 minutes, the flowing gas was switched from Ar to the $O_2$/balance $N_2$ mixed gas, and then the temperature was kept at 270° C. for 45 minutes under flowing of the gas at 100 cc/min. A temperature at which an exothermic peak or weight reduction was observed in TG-DTA was measured, and the temperature was evaluated as a combustion start temperature. The obtained results are shown in Table 1. FIG. 1 is a graph showing the analytical results of the samples of Examples 1 and 2 and Comparative Examples 1 and 2. In FIG. 1, "DP" is an abbreviation of diesel particulate and corresponds to PM.

TABLE 1

|  | Combustion start temperature (° C.) | Activation energy (eV) |
|---|---|---|
| Example 1 | 240 to 270 | 0.14 |
| Example 2 | 300 to 330 | 0.21 |
| Example 3 | 270 to 300 (Ar) | — |
| Example 4 | 270 to 300 (Ar) | — |
| Comparative Example 1 | 300 to 330 | 0.35 |
| Comparative Example 2 | 300 to 330 | 0.45 |

Table 1 and FIG. 1 indicate that the layered composite oxides of Examples 1 to 4 within the scope of the present invention have low PM combustion start temperatures and low activation energy and excellent catalytic activity as compared with the layered composite oxides of Comparative Examples 1 and 2. In particular, it is found that an amount of substitution of B by copper (Cu) or iron (Fe) is preferably 0 to 0.2. Also, it is found that when copper (Cu) is selected, the catalytic activity is most excellent. Further, it is found that the layered composite oxides of Examples 1 to 4 within the scope of the present invention have low PM combustion temperatures and excellent catalytic activity even when not containing a noble metal.

Although the present invention is described above with reference to a few examples and comparative examples, the present invention is not limited to these examples, and modification can be made within the scope of the present invention. For example, PM combustion performance was evaluated in the examples, but the layered composite oxide of the present invention also has ternary purification performance and NOx reduction performance. In addition, it is obvious from the above-described PM combustion performance that good results are exhibited for DPF.

The excellent oxygen ion conductivity possessed by the layered composite oxide of the present invention can be applied to not only an exhaust gas purification catalyst but also a fuel cell electrode catalyst and a photocatalyst and can realize an excellent fuel cell and photocatalyst.

The invention claimed is:
1. A layered composite oxide comprising:
a composition represented by the following formula (1):
La1.5Sr1.5Mn2-yByO7 . . . (1), wherein
in the formula, B represents Cu and/or Fe, and y satisfies 0<y≤0.2).
2. The layered composite oxide according to claim 1, wherein
B in the formula (1) is Cu.
3. An oxidation catalyst comprising the layered composite oxide according to claim 1.
4. A diesel particulate filter configured to purify a particulate matter, the diesel particulate filter comprising the oxidation catalyst according to claim 3, and comprising:
an integral structure-type support coated with the oxidation catalyst.
5. A ternary catalyst comprising the layered composite oxide according to claim 1.

6. A nitrogen oxide purification catalyst comprising the layered composite oxide according to claim 1.

7. An oxidation catalyst comprising the layered composite oxide according to claim 2.

8. A ternary catalyst comprising the layered composite oxide according to claim 2.

9. A nitrogen oxide purification catalyst comprising the layered composite oxide according to claim 2.

* * * * *